(12) United States Patent
Otsuka et al.

(10) Patent No.: US 11,270,680 B2
(45) Date of Patent: Mar. 8, 2022

(54) SOUNDPROOF STRUCTURE AND METHOD OF MANUFACTURING SOUNDPROOF STRUCTURE

(71) Applicant: Nitto Denko Corporation, Osaka (JP)

(72) Inventors: Tetsuya Otsuka, Osaka (JP); Naoto Hayashi, Fukuoka (JP); Takeshi Sutou, Tokyo (JP)

(73) Assignee: Nitto Denko Corporation, Osaka (JP)

( * ) Notice: Subject to any disclaimer, the term of this patent is extended or adjusted under 35 U.S.C. 154(b) by 435 days.

(21) Appl. No.: 16/385,112

(22) Filed: Apr. 16, 2019

(65) Prior Publication Data

US 2019/0244598 A1    Aug. 8, 2019

Related U.S. Application Data

(63) Continuation of application No. PCT/JP2017/037543, filed on Oct. 17, 2017.

(30) Foreign Application Priority Data

Oct. 19, 2016    (JP) .............................. JP2016-205172

(51) Int. Cl.
  *G10K 11/168* (2006.01)
  *G10K 11/16* (2006.01)
  (Continued)

(52) U.S. Cl.
  CPC ............ *G10K 11/168* (2013.01); *B32B 5/145* (2013.01); *B32B 5/26* (2013.01); *B32B 7/02* (2013.01);
  (Continued)

(58) Field of Classification Search
  CPC ...... G10K 11/168; G10K 11/16; B32B 5/145; B32B 7/02; B32B 37/00; B32B 2250/02;
  (Continued)

(56) References Cited

U.S. PATENT DOCUMENTS

| 2004/0077247 | A1* | 4/2004 | Schmidt | ................. | D04H 3/147 |
| | | | | | 442/382 |
| 2014/0224572 | A1* | 8/2014 | Tsujino | ............... | B41F 13/0024 |
| | | | | | 181/201 |
| 2021/0214486 | A1* | 7/2021 | Senda | ................... | B32B 27/308 |

FOREIGN PATENT DOCUMENTS

| CN | 213767532 U | * | 7/2021 |
| JP | 2008-076871 | | 4/2008 |

(Continued)

OTHER PUBLICATIONS

Office Action dated Feb. 8, 2021 issued with respect to the corresponding Taiwanese patent application No. 106135702.
(Continued)

*Primary Examiner* — Forrest M Phillips
(74) *Attorney, Agent, or Firm* — IPUSA, PLLC

(57) ABSTRACT

A soundproof structure includes a porous fibrous body that attenuates incident sound waves, wherein the fibrous body is formed of fibers having an average fiber diameter of 0.5 μm or more and 5 μm or less, and includes a surface layer on which the sound waves are incident and a propagation layer that is stacked with the surface layer and that propagates the sound waves from the surface layer, and wherein the propagation layer includes a high density layer having a density higher than a density of the surface layer.

5 Claims, 6 Drawing Sheets

(51) Int. Cl.
    *F02B 77/13*     (2006.01)
    *B32B 5/14*     (2006.01)
    *D04H 3/004*     (2012.01)
    *B60R 13/08*     (2006.01)
    *B32B 5/26*     (2006.01)
    *B32B 7/02*     (2019.01)
    *B32B 37/00*     (2006.01)
    *B62D 29/04*     (2006.01)
    *E04B 1/84*     (2006.01)
    *B62D 25/04*     (2006.01)

(52) U.S. Cl.
    CPC .............. *B32B 37/00* (2013.01); *B60R 13/08* (2013.01); *B62D 25/04* (2013.01); *B62D 29/04* (2013.01); *D04H 3/004* (2013.01); *E04B 1/8404* (2013.01); *F02B 77/13* (2013.01); *G10K 11/16* (2013.01); *B32B 2250/02* (2013.01); *B32B 2250/03* (2013.01); *B32B 2262/02* (2013.01); *B32B 2262/0246* (2013.01); *B32B 2262/0261* (2013.01); *B32B 2262/0276* (2013.01); *B32B 2262/0284* (2013.01); *B32B 2262/0292* (2013.01); *B32B 2262/101* (2013.01); *B32B 2262/106* (2013.01); *B32B 2307/102* (2013.01); *B32B 2307/732* (2013.01); *E04B 2001/8461* (2013.01)

(58) Field of Classification Search
    CPC ............ B32B 2250/03; B32B 2262/02; B32B 2262/0246; B32B 2262/0261; B32B 2262/0276; B32B 2262/0284; B32B 2262/0292; B32B 2262/101; B32B 2262/106; B32B 2307/102; B32B 2307/732; B60R 13/08; B62D 25/04; B62D 29/04; D04H 3/004; E04B 1/8404; E04B 2001/8461; F02B 77/13
    See application file for complete search history.

(56) References Cited

FOREIGN PATENT DOCUMENTS

| | | |
|---|---|---|
| JP | 2009-157060 | 7/2009 |
| JP | 2014-153700 | 8/2014 |
| JP | 2016-141248 | 8/2016 |
| WO | 2016/125645 | 8/2016 |
| WO | WO-2021117901 A1 * | 6/2021 |

OTHER PUBLICATIONS

International Search Report for PCT/JP2017/037543 dated Jan. 9, 2018.

Office Action dated Jul. 28, 2020 issued with respect to the corresponding Japanese Patent Application No. 2018-546359.

Extended European Search Report dated Jan. 30, 2020 issued with respect to the corresponding European Patent Application No. 17862512.5.

Office Action dated Apr. 15, 2021 issued with respect to the corresponding European patent application No. 17862512.5.

Partial European Search Report dated Oct. 1, 2019 issued with respect to the corresponding European Patent Application No. 17862512.5.

Office Action dated Jun. 8, 2021 issued with respect to the corresponding Taiwanese Patent Application No. 106135702.

* cited by examiner

SOUNDPROOF STRUCTURE AND METHOD OF MANUFACTURING SOUNDPROOF STRUCTURE

CROSS-REFERENCE TO RELATED APPLICATIONS

The present application is a continuation application of International Application No. PCT/JP2017/037543 filed on Oct. 17, 2017, which claims priority to Japanese Patent Application No. 2016-205172 filed on Oct. 19, 2016. The contents of these applications are incorporated herein by reference in their entirety.

BACKGROUND OF THE INVENTION

1. Field of the Invention

The present invention relates to a soundproof structure that attenuates incident sound waves and a method of manufacturing a soundproof structure.

2. Description of the Related Art

As noise reduction measures for vehicles, buildings, household electrical appliances, and the like, sound-proof structures that attenuate sound waves are used. For soundproof structures, (1) porous bodies, (2) vibration plates, and (3) through-hole plates are developed.

A porous body is formed of fibers, foamed resin, or the like. When sound waves enter the porous body, air vibrates inside the porous body. In this case, friction occurs between the fibers or the foam resin and the air, and the sound waves are attenuated by converting energy of sound into heat.

By vibrating with sound waves, a vibration plate converts sound energy into vibrational energy and attenuates the sound waves.

A through-hole plate utilizes a phenomenon in which an air layer disposed opposite a sound source with respect to the plate resonates with sound waves. Due to the resonance of the air layer, air inside the through hole strongly vibrates, friction occurs, sound energy is converted into heat, and the sound waves are attenuated.

Other soundproof structures are proposed in which a plurality of porous layers having different densities are stacked.

For example, a sound absorber described in Patent Document 1 includes a PET felt and a silica mat stacked on the sound source side of the PET felt. The PET felt has a density of 35 kg/m$^3$ because its thickness is 40 mm and its surface density is 1.4 kg/m$^2$. On the other hand, the silica mat has a density of 80 kg/m$^3$, because its thickness is 5 mm and its surface density is 0.4 kg/m$^2$. Accordingly, the silica mat, which is a high density layer, is disposed on the sound source side, and a PET felt, which is a low density layer, is disposed on the opposite side of the sound source side. The sound absorber utilizes the low density layer as a spring and the high density layer as a vibration film to convert energy of sound waves to vibrational energy and to attenuate the sound waves.

PRIOR ART DOCUMENTS

Patent Documents

[Patent Document 1] Japanese Unexamined Patent Application Publication No. 2008-76871

DISCLOSURE OF THE INVENTION

Problem to be Solved by the Invention

As in a sound absorber described in Patent Document 1, by disposing a high density layer on the sound source side and a low density layer on the opposite side of the sound source side, energy of sound waves can be converted into vibrational energy, and sound waves can be efficiently attenuated in a specific frequency band in which the center is the resonant frequency.

However, because of wide frequencies of noise, a soundproof structure that can efficiently attenuate sound waves in a wide frequency band is desired.

In view of the above problem, the present invention has a main object to provide a soundproof structure that can efficiently attenuate sound waves in a wide frequency band.

Means for Solving the Problem

In view of the above problem, in one aspect of the present invention, a soundproof structure includes a porous fibrous body that attenuates incident sound waves, wherein the fibrous body is formed of fibers having an average fiber diameter of 0.5 μm or more and 5 μm or less, and includes a surface layer on which the sound waves are incident and a propagation layer that is stacked with the surface layer and that propagates the sound waves from the surface layer, and wherein the propagation layer includes a high density layer having a density higher than a density of the surface layer.

Effects of the Invention

According to one aspect of the present invention, it is possible to provide a soundproof structure that can efficiently attenuate sound waves in a wide frequency band.

EMBODIMENT FOR CARRYING OUT THE INVENTION

Figure 1:
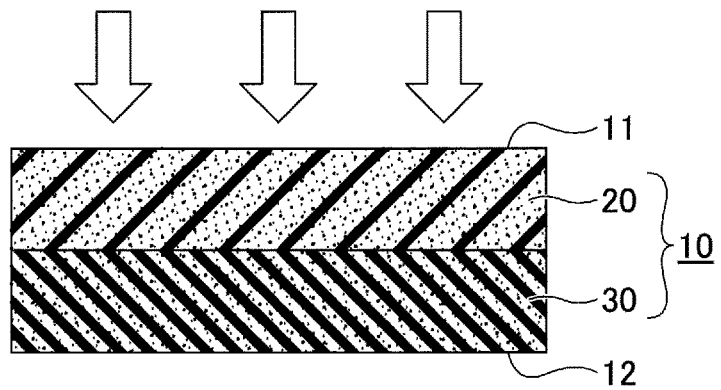
FIG. 1 is a cross-sectional view illustrating a soundproof structure according to one embodiment.

In the following, an embodiment for carrying out the present invention will be described with reference to the drawings. In each drawing, the same or corresponding reference numerals are gives to the same or corresponding elements such that the descriptions of the same or corresponding elements are omitted.

Embodiment

FIG. 1 is a cross-sectional view illustrating a soundproof structure according to one embodiment. In FIG. 1, the directions of the arrows represent the directions in which sound waves enter the fibrous body 10. Note that in FIG. 1, although the sound waves vertically enter the surface 11 of the fibrous body 10, the sound waves may obliquely enter the surface 11 of the fibrous body 10.

The soundproof structure includes the porous fibrous body 10 that attenuates incident sound waves. The fibrous body 10 may be intertwined fibers, and may be a woven or non-woven fabric. The fibrous body 10 attenuates incident sound waves by converting the energy of the incident sound waves into heat. When sound waves enter the fibrous body 10, because air vibrates inside the porous fibrous body 10, friction is caused between fibers forming the fibrous body 10 and the air and sound energy is converted into heat.

The fibrous body 10 may be used as a sound absorbent or as a sound insulator. The sound absorbent is used in order to suppress reflection of sound waves incident from a sound source. The sound insulator is used in order to suppress transmission of sound waves incident from a sound source. The fibrous body 10 may also serve as both a sound absorbent and a sound insulator.

The fibrous body 10 is used to control noise from vehicles, buildings, household electrical appliances, and large electrical appliances. Vehicles include, for example, automobiles, trains, airplanes, and the like. Noise of a vehicle includes traveling noise, reflected noise that occurs when the traveling noise is reflected by a tunnel or a sound shielding wall, and an operating noise of a mountable device (which is an air conditioner, or an engine, for example) mounted on the vehicle. Buildings include, for example, factories, movie theaters, karaoke boxes, music halls, and the like. Household electric appliances include, for example, refrigerators, vacuum cleaners, outdoor units of air conditioners, household batteries, hot-water wash toilet seats, and the like. Large electrical appliances include, for example, professional-use refrigerators and the like.

The shape of the fibrous body 10 may be a plate shape for various applications. In this case, at least one of the main surfaces is used as the surface 11 on which sound waves are incident. Note that the shape of the fibrous body 10 is not limited to a plate shape, and may be a shape suitable for an application.

The fibers that form the fibrous body 10 may be organic fibers. As materials for organic fibers, general-purpose plastics, engineering plastics, super engineering plastics, or the like can be used. The general-purpose plastics include polypropylene (PP), polyethylene (PE), polyurethane (PU), polylactic acid (PLA), acrylic resins (e.g., PMMA), and the like. The engineering plastics include polyethylene terephthalate (PET), nylon 6 (N6), nylon 6,6 (N66), nylon 12 (N12), and the like. The super Engineering plastics include polyphenylene sulfide (PPS), liquid crystal polymers (LCP), and the like. The fibrous body 10 may be formed of one type of organic fiber or may be formed of a plurality of types of organic fiber.

Note that although the fibers that form the fibrous body 10 of the present embodiment are organic fibers, the fibrous body 10 may be formed of inorganic fibers. As inorganic fibers, glass fibers, carbon fibers, or the like can be used. Organic fibers and inorganic fibers may be combined.

The average fiber diameter of the fibrous body 10 is 5 µm or less. When the average fiber diameter of the fibrous body 10 is 5 µm or less, friction between the fibers and air easily occurs because the surface area of fibers per unit volume is wide. Thus, sound waves can be efficiently attenuated, and in particular, sound waves at frequencies 600 Hz or less can be efficiently attenuated. The average fiber diameter of the fibrous body 10 is preferably 4 µm or less and is more preferably 3 µm or less.

The average fiber diameter of the fibrous body 10 is 0.5 µm or more. When the average fiber diameter of the fibrous body 10 is 0.5 µm or more, it is easy to manufacture the fibrous body 10 having a thickness of 40 mm or more, and the strength of the fibrous body 10 is sufficiently obtained. The average fiber diameter of the fibrous body 10 is preferably 1 µm or more.

The average fiber diameter of the fibrous body 10 is measured using an electron microscope. Specifically, the fibrous body 10 is imaged by an electron microscope, and fiber diameters of arbitrary 100 fibers are measured, and the average value of the 100 measured data items is obtained as the average fiber diameter.

As will be described in more detail below, the density of the fibrous body 10 varies in a stepwise manner from the surface 11 on which sound waves are incident to the back surface 12. Therefore, since the fiber diameter may vary in a stepwise manner from the surface 11 to the back surface 12, the average fiber diameter may be measured using electron microscope photographs in longitudinal cross-sections of fibrous body 10.

The longitudinal cross-sections of the fibrous body 10 mean cross-sections perpendicular to the surface 11 of the fibrous body 10. The cross-sections are evenly divided into ten sections from the surface 11 to the back surface 12, any ten fiber diameters are measured in each of the sections, and the average value of the 100 measured data items is obtained as the average fiber diameter.

The average value of the ten fiber diameters measured for each section may be consistent within a range of errors, regardless of the distance from surface 11. Note that the average value of ten fiber diameters measured for each section may vary depending on the distance from the surface.

The density of the fibrous body 10 varies with the distance from the surface 11 on which sound waves are incident. The density of the fibrous body 10 is the sum of fibers forming the fibrous body 10 and voids contained in the fibrous body 10. As the percentage of voids per unit volume decreases, the density of the fibrous body 10 increases.

The fibrous body 10 includes the surface layer 20 and the back layer 30 in this order from the surface 11 on which the sound waves are incident to the back surface 12. The surface layer 20 and the back layer 30 are formed as homogeneous porous layers, respectively. The back layer 30 is a propagation layer that is stacked with the surface layer 20 and that propagates the sound waves from the surface layer 20. Also, the back layer 30 is a high dense layer having a density greater than the density of the surface layer 20.

The surface layer 20 and the back layer 30 may be combined after being separately formed. For example, a needle punching method is used for the combination. The needle punching method is a method in which needles are inserted into a fibrous body in which a surface layer 20 and a back layer 30 are stacked, and recesses or protrusions of the side surfaces of the needles are used to intertwine the fibers near the interface between the surface layer 20 and the back layer 30.

The surface layer 20 and the back layer 30 may be combined by using an adhesive, such as double-sided tape. In this case, the soundproof structure further includes the adhesive other than the fibrous body 10. The adhesive is preferably formed in a network arrangement.

The surface layer 20 and the back layer 30 may be formed integrally. In this case, as a method of manufacturing the fibrous body 10, a melt blowing method is preferable, for example.

The melt blowing method is a method in which a molten thermoplastic resin is blown out from a nozzle and stretched into fibers at high temperature and high velocity airflow to spin fibers on a target plate. By varying the distance between the target plate and the nozzle, the surface layer 20 and the back layer 30 with different densities can be formed continuously.

Note that the method of manufacturing the fibrous body 10 is not limited to the melt blowing method, and may be, for example, an electric field spinning method. In the electric field spinning method, by varying the distance between a nozzle that blows out a material and a target plate, the surface layer 20 and the back layer 30 with different densities can also be formed continuously. According to the melt blowing method and the electric field spinning method, nonwoven fabrics are obtained. According to the electric field spinning method, not only organic fibers but also inorganic fibers can be spun.

Figure 2:
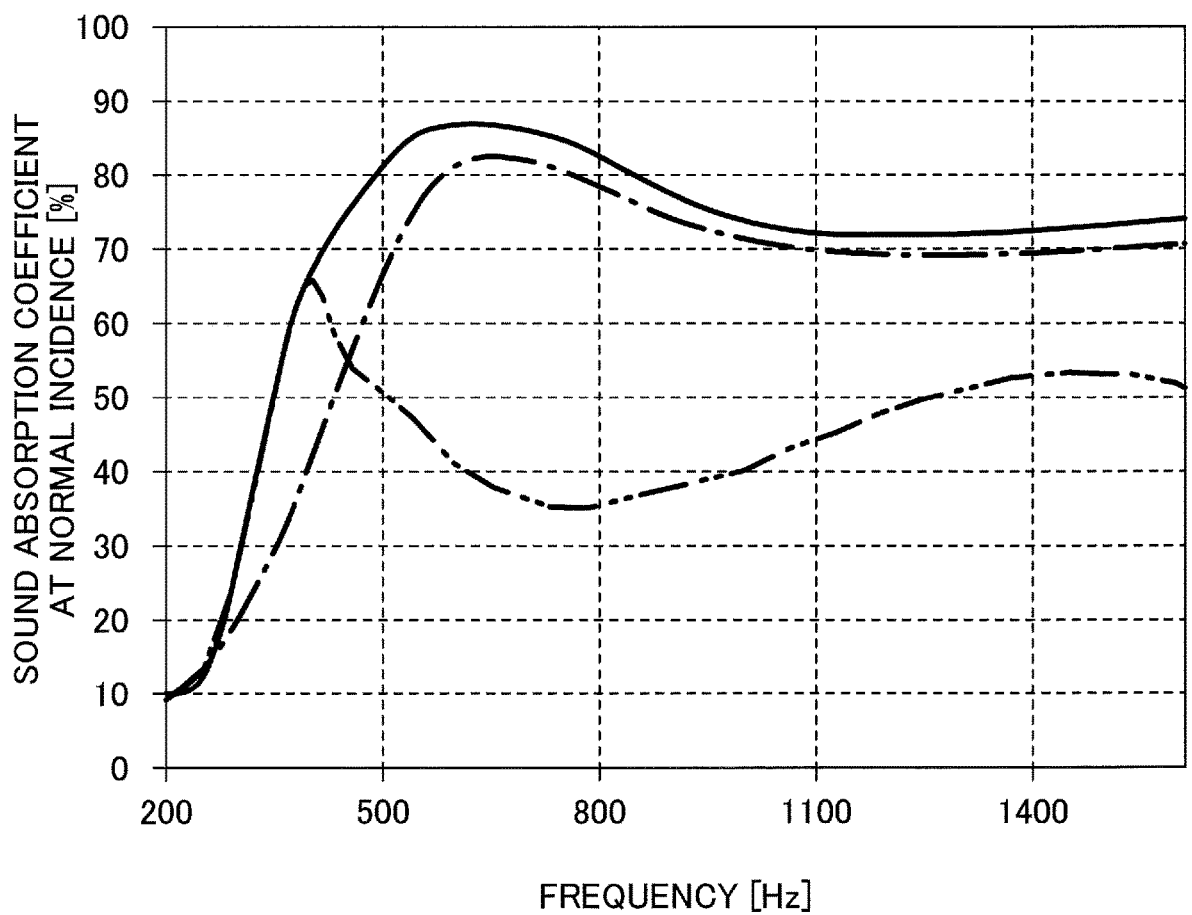
FIG. 2 is a diagram illustrating sound absorption characteristics of the soundproof structure according to one embodiment.

FIG. 2 is a diagram illustrating sound absorption characteristics of the fibrous body according to one embodiment. In FIG. 2, the solid line indicates the sound absorption characteristics of the fibrous body 10, the single-dot chain line indicates the sound absorption characteristics of the surface layer 20 alone, and the double-dot chain line indicates the sound absorption characteristics of the back layer 30 alone.

In a case where the back layer 30 having a relatively high density is used alone, as compared with a case where the surface layer 20 having a relatively low density is used alone, the sound absorption coefficient at frequencies of 400 Hz or less is improved, while the sound absorption coefficient at frequencies of 400 Hz or more and 1000 Hz or less is decreased.

Accordingly, in the present embodiment, with respect to the surface layer 20, the back layer 30 having a higher density than that of the surface layer 20 is disposed opposite a sound source. That is, the high density layer is disposed opposite the sound source with respect to the low density layer. With this, the sound waves in a wide frequency band are attenuated as illustrated by the solid line in FIG. 2.

The reason why the high density layer is disposed on the side opposite to the sound source side with respect to the low density layer is that in a case where the arrangement of the low density layer and the high density layer is opposite, that is, in a case where the low density layer is disposed on the side opposite to the sound source side with respect to the high density layer, the low density layer acts as a spring, and the high density layer vibrates.

In this case, the sound absorption characteristics obtained when the low density layer or the high density layer is respectively used alone are not sufficiently obtained, and frequencies of sound waves that can be efficiently attenuated are limited to frequencies close to the resonant frequency of the high density layer.

According to the present embodiment, with respect to the surface layer 20, the back layer 30 having a higher density than that of the surface layer 20 is disposed opposite a sound source. Accordingly, the sound absorption characteristics obtained in a case where the surface layer 20 or the back layer 30 is respectively used alone are sufficiently obtained, and sound waves in a wide frequency band can be efficiently attenuated.

Note that although the density increases in a stepwise manner from the surface 11 on which sound waves are incident to the back surface 12 in the fibrous body 10 according to the present embodiment, the fibrous body 10 may be constituted by a large number of layers, and the density may be increased in a continuous manner. In this case, it is also possible to efficiently attenuate sound waves in a wide frequency band.

In a case where the density increases in a continuous manner from the surface 11 to the back surface 12, the density of the surface layer 20 is represented by the average density of a portion within 1 mm from the surface 11.

Depending on the distance from the surface 11, the density of the fibrous body 10 may vary in a range from 20 $kg/m^3$ or more to 20 $kg/m^3$ or less. Within this range, the sound absorption characteristics of the low density layer and the sound absorption characteristics of the high density layer are sufficiently obtained.

The bulk density of the fibrous body 10 is, for example, 40 $kg/m^3$ or more and 50 $kg/m^3$ or less. The bulk density of the fibrous body 10 is obtained by dividing the total mass of the fibrous body 10 by the total volume of the fibrous body 10. The bulk density of the fibrous body 10 can be said to be the average value of the densities of the fibrous body 10.

When the bulk density of the fibrous body 10 is 40 $kg/m^3$ or more, friction between the fibers and air easily occurs because the surface area of fibers per unit volume is wide. Thus, sound waves can be efficiently attenuated, and in particular, sound waves at frequencies 250 Hz or more and 300 Hz or less can be efficiently attenuated.

On the other hand, when the bulk density of the fibrous body 10 is 50 $kg/m^3$ or less, it is possible to suppress a decrease in the sound absorption coefficient at frequencies of 400 Hz or more and 1000 Hz or less. If the bulk density of the fibrous body 10 exceeds 50 $kg/m^3$, because the overall density is too large, the overall sound absorption characteristics approach sound absorption characteristics as indicated by the double-dot chain line illustrated in FIG. 2.

The bulk density of the fibrous body 10 is preferably 42 $kg/m^3$ or more and 50 $kg/m^3$ or less, as in Example 1 to Example 2 in the description for Working Examples. When the bulk density of the fibrous body 10 is 42 $kg/m^3$ or more and 50 $kg/m^3$ or less, as will be described for Working Examples, sound waves in a wider frequency band can be more efficiently attenuated.

The thickness of the fibrous body 10 is, for example, 40 mm or more and 100 mm or less. The thickness of the fibrous body 10 is measured in a direction perpendicular to the surface 11 of the fibrous body 10. When the thickness of the fibrous body 10 is 40 mm or more, the sound absorption coefficient of sound waves at frequencies of 350 Hz or more can be sufficiently obtained. Although there is no upper limit for the thickness of the fibrous body 10 in terms of the sound absorption coefficient, the thickness of the fibrous body 10 is 100 mm or less in terms of an installation space or the like.

The thickness of the fibrous body 10 is preferably 90 mm or less, is more preferably 80 mm or less, and is particularly preferably 70 mm or less.

The sound absorption coefficient at normal incidence of the fibrous body 10 with respect to sound waves at any frequency within a range of 350 Hz or more to 2000 Hz or less is, for example, 55% or more. The sound absorption coefficient at normal incidence is measured in accordance with Japanese Industrial Standards (JIS A 1405-2). Specifically, the ratio ($\Delta$I/Ii) of the value ($\Delta$I=Ii−Ir) obtained by subtracting, from the energy (Ii) of incident sound when sound waves vertically enter the surface 11 of the fibrous body 10, the energy (Ir) of reflected sound to the energy (Ii) of the incident sound is obtained.

When the sound absorption coefficient at normal incidence of the fibrous body 10 is 55% or more with respect to sound waves at any frequency within the range of 350 Hz or more to 2000 Hz or less, unpleasant sound is almost not heard.

First Modified Example

With respect to the fibrous body having a structure of two layers in the embodiment described above, a fibrous body of the present modified example has a structure of three layers. In the following, the differences will be mainly described. Note that the fibrous body is not limited to have a structure of two layers or a structure of three layers, and may have a structure of multi layers of four or more layers.

Figure 3:
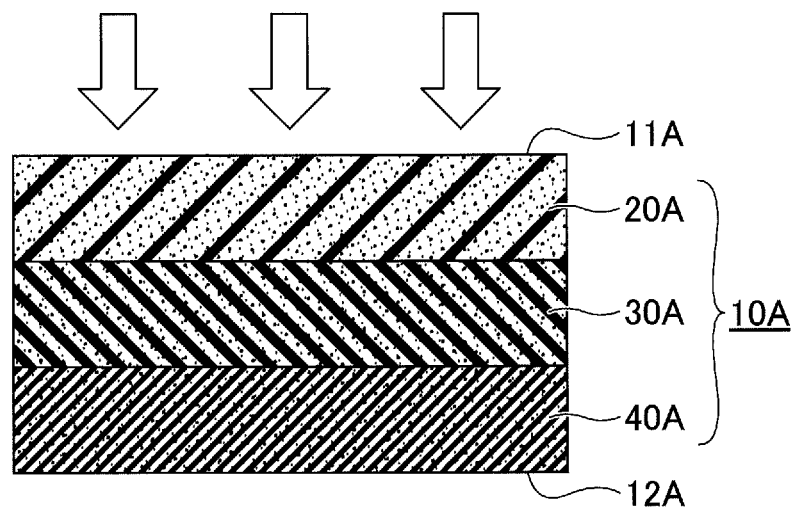
FIG. 3 is a cross-sectional view illustrating a soundproof structure according to a first modified example.

FIG. 3 is a cross-sectional view illustrating a soundproof structure according to a first modified example. In FIG. 3, the directions of the arrows represent the directions in which sound waves enter a fibrous body 10A. Note that in FIG. 3, although the sound waves vertically enter a surface 11A of the fibrous body 10A, the sound waves enter may obliquely enter the surface 11A of the fibrous body 10A.

The soundproof structure includes the porous fibrous body 10A that attenuates incident sound waves. Similarly to the fibrous body 10, the average fiber diameter of the fibrous body 10A is 0.5 μm or more and 5 μm or less.

The fibrous body 10A includes a surface layer 20A, an intermediate layer 30A, and a back layer 40A in this order from the surface 11A on which the sound waves are incident to the back surface 12A. The surface layer 20A, the intermediate layer 30A, and the back layer 40A are formed as homogeneous porous layers, respectively. The intermediate layer 30A and back layer 40A constitute a propagation layer that is stacked with the surface layer 20A and that propagates the sound waves from the surface layer 20A.

The density of the fibrous body 10A increases in a stepwise manner from the surface 11A to the back surface 12A. Specifically, the density of the intermediate layer 30A is greater than the density of the surface layer 20A, and the density of the back layer 40A is greater than the density of the intermediate layer 30A.

Since the density of the intermediate layer 30A is greater than the density of the surface layer 20A, it is possible to suppress the intermediate layer 30A from functioning as a spring and it is possible to suppress the surface layer 20A from vibrating. Accordingly, the sound absorption characteristics obtained in a case where the surface layer 20A or the intermediate layer 30A is respectively used alone are sufficiently obtained, and sound waves in a wide frequency band can be efficiently attenuated.

Also, since the density of the back layer 40A is greater than the density of the intermediate layer 30A, it is possible to suppress the back layer 40A from functioning as a spring and it is possible to suppress the intermediate layer 30A from vibrating. Accordingly, the sound absorption characteristics obtained in a case where the intermediate layer 30A or the back layer 40A is respectively used alone are sufficiently obtained, and sound waves in a wide frequency band can be efficiently attenuated.

Note that although the density increases in a stepwise manner from the surface 11A on which sound waves are incident to the back surface 12A in the fibrous body 10A of the present modified example, the fibrous body 10A may be constituted by a large number of layers, and the density may be continuously increased. In this case, it is also possible to efficiently attenuate sound waves in a wide frequency band.

In the present modified example, both the intermediate layer 30A and the back layer 40A correspond to a high density layer as claimed, but either the intermediate layer 30A or the back layer 40A may correspond to a high density layer as claimed.

For example, in a case where the density of the intermediate layer 30A is greater than the density of the surface layer 20A, desired effects can be obtained even when the density of the back layer 40A is less than the density of the surface layer 20A. Also, in a case where the density of the back layer 40A is greater than the density of the surface layer 20A, desired effects can be obtained even when the density of the intermediate layer 30A is less than the density of the surface layer 20A.

As long as a high density layer having a density greater than the density of the surface layer 20A is disposed opposite a sound source with respect to the surface layer 20A, vibration of the surface layer 20A can be suppressed to a certain degree.

Accordingly, as long as a high density layer is disposed opposite a sound source with respect to the surface layer 20A, the density may partially decrease in a stepwise manner or in a continuous manner between the surface 11A and the back surface 12A. For example, the density of the back layer 40A may be less than the density of the intermediate layer 30A.

Second Modified Example

While sound waves enter the fibrous body of the first modified example from one surface in the stacking direction, sound waves enter a fibrous body of the present modified example from both surfaces. In the following, the differences will be mainly described. Note that in a case where sound waves enter the fibrous body from both sides, the fibrous body is not to have a structure of three layers and may have a structure of multi layers of four or more layers.

Figure 4:
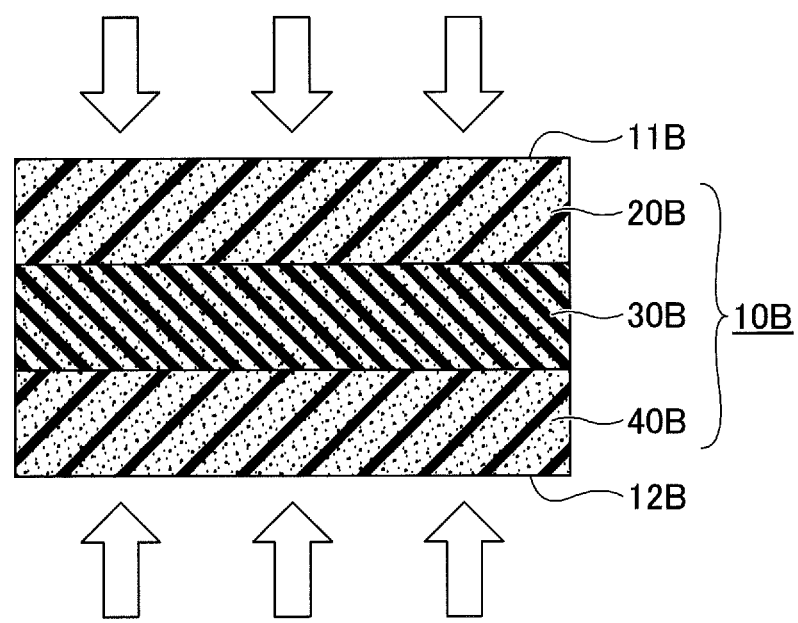
FIG. 4 is a cross-sectional view illustrating a soundproof structure according to a second modified example.

FIG. 4 is a cross-sectional view illustrating a soundproof structure according to a second modified example. In FIG. 4, the directions of the arrows represent the directions in which sound waves enter a fibrous body 10B. Note that in FIG. 4, although the sound waves vertically enter a first surface 11B and a second surface 11B of the fibrous body 10B, the sound waves may obliquely enter the first surface 11B and the second surface 11B of the fibrous body 10B.

The soundproof structure includes the porous fibrous body 10B that attenuates incident sound waves. Similarly to the fibrous body 10, the average fiber diameter of the fibrous body 10B is 0.5 μm or more and 5 μm or less.

The fibrous body 10B includes a first surface layer 20B, an intermediate layer 30B, and a second surface layer 40B in this order from the first surface 11B on which sound waves are incident to the second surface 12B on which sound waves are incident. The first surface layer 20B, the intermediate layer 30B, and the second surface layer 40B are formed as homogeneous porous layers, respectively.

The intermediate layer 30B is a propagation layer that is stacked with the first surface layer 20B and the second surface layer 40B and that propagates the sound waves from the first surface layer 20B and the second surface layer 40B. Also, the intermediate layer 30B is a high density layer having a density greater than the density of the first surface layer 20B and the density of the second surface layer 40B.

Since the density of the intermediate layer 30B is greater than the density of the first surface layer 20B, it is possible to suppress the first surface layer 20A from vibrating. Accordingly, the sound absorption characteristics obtained in a case where the first surface layer 20B or the intermediate layer 30B is respectively used alone are sufficiently obtained, and sound waves in a wide frequency band can be efficiently attenuated.

Also, since the density of the second surface layer 40B is greater than the density of the intermediate layer 30B, it is possible to suppress the second surface layer 40B from vibrating. Accordingly, the sound absorption characteristics obtained in a case where the second surface layer 40B or the intermediate layer 30B is respectively used alone are sufficiently obtained, and sound waves in a wide frequency band can be efficiently attenuated.

Note that although the density increases in a stepwise manner from each of the first surface 11B and the second surface 12B to the intermediate layer 30B in the fibrous body 10B of the present modified example, the fibrous body 10B may be constituted by a large number of layers, and the density may be continuously increased. In this case, it is also possible to efficiently attenuate sound waves in a wide frequency band.

Also, as long as a high density layer having a density greater than the density of the first surface layer 20B and the density of the second surface layer 40B is disposed between the first surface layer 20B and the second surface layer 40B, the density may be partially decrease in a stepwise manner or in a continuous manner from each of the first surface 11B and the second surface 12B to the intermediate layer 30B.

For example, between the first surface layer 20B and the intermediate layer 30B, a layer having a density less than the density of the first surface layer 20B may be disposed. Also, between the second surface layer 40B and the intermediate layer 30B, a layer having a density less than the density of the second surface layer 40B may be disposed.

When a high density layer having a density greater than the density of the first surface layer 20B or the density of the second surface layer 40B is disposed between the first surface layer 20B and the second surface layer 40B, vibration of the first surface layer 20B or the second surface layer 40B can be suppressed to a certain degree.

[Installation Examples of Sound-Proof Structures]

Figure 5:
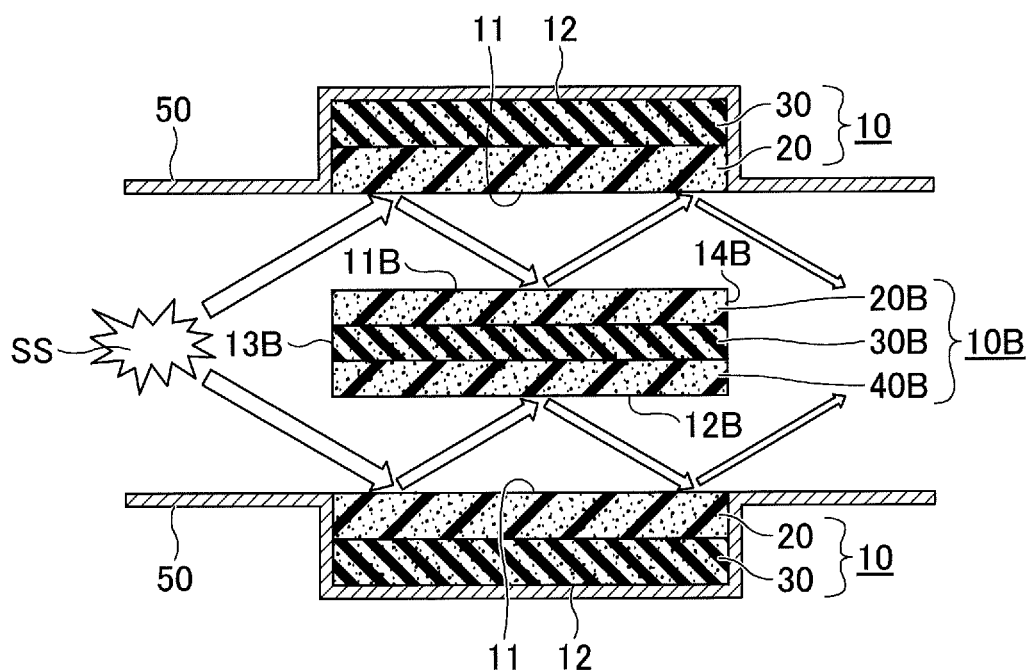
FIG. 5 is a cross-sectional view illustrating an installation example of the fibrous bodies of FIG. 1 and the fibrous body of FIG. 4.

FIG. 5 is a cross-sectional view illustrating an installation example of the fibrous bodies of FIG. 1 and the fibrous body of FIG. 4. In FIG. 5, the directions of the arrows indicate the directions in which sound waves travel, and the thicknesses of the arrows indicate the magnitudes of the sound wave energies. Also, in FIG. 5, SS represents a sound source that generates sound waves.

The fibrous bodies 10 and the fibrous body 10B are attached to a duct 50 of a factory, an air conditioner, or the like, to attenuate sound waves passing through the duct 50 and reduce noise from the duct 50.

The fibrous bodies 10 are secured to the inner wall surface of the duct 50. An air layer is not formed between the fibrous bodies 10 and the inner wall surface of the duct 50, but may be formed. Each of the fibrous bodies 10 includes the surface 11 toward the inside of the duct 50 as a surface on which sound waves are incident. Note that instead of the fibrous bodies 10 or in addition to the fibrous bodies 10, the fibrous bodies 10A illustrated in FIG. 3 may be secured to the inner wall surface of the duct 50.

The fibrous body 10B is suspended inside the duct 50 by a wire mesh or the like. The fibrous body 10B includes, as surfaces on which sound waves are incident, the first surface 11B and the second surface 12B that form a sound path between the inner wall surfaces of the duct 50.

Note that although sound waves also enter a first end surface 13B (see FIG. 5), the area of the first end surface 13B is small as compared to the area of the first surface 11B and the area of the second surface 12B. Thus, the energy of sound waves that enter the first end surface 13B is small as compared to the energy of sound waves that enter the first surface 11B and the energy of sound waves that enter the second surface 12B. Additionally, the distance between the first end surface 13B and a second end surface 14B opposite the first end surface 13B is sufficiently long. Thus, the energy of sound waves that enter the first end surface 13B can be sufficiently attenuated by the fibrous body 10B.

Figure 6:
FIG. 6 is a cross-sectional view illustrating a soundproof structure according to a third modified example.

In a case where the energy of sound waves that enter the first end surface 13B is high, a fibrous body 10C illustrated in FIG. 6 may be used instead of the fibrous body 10B illustrated in FIG. 5.

The fibrous body 10C includes a surface layer 20C and a core layer 30C formed inside the surface layer 20C. The core layer 30C is a propagation layer that is stacked with the surface layer 20C and that propagates sound waves from the surface layer 20C. Also, the core layer 30C is a high density layer having a density greater than the density of the surface layer 20C. The fibrous body 10C can efficiently attenuate sound waves incident from any direction.

Figure 7:
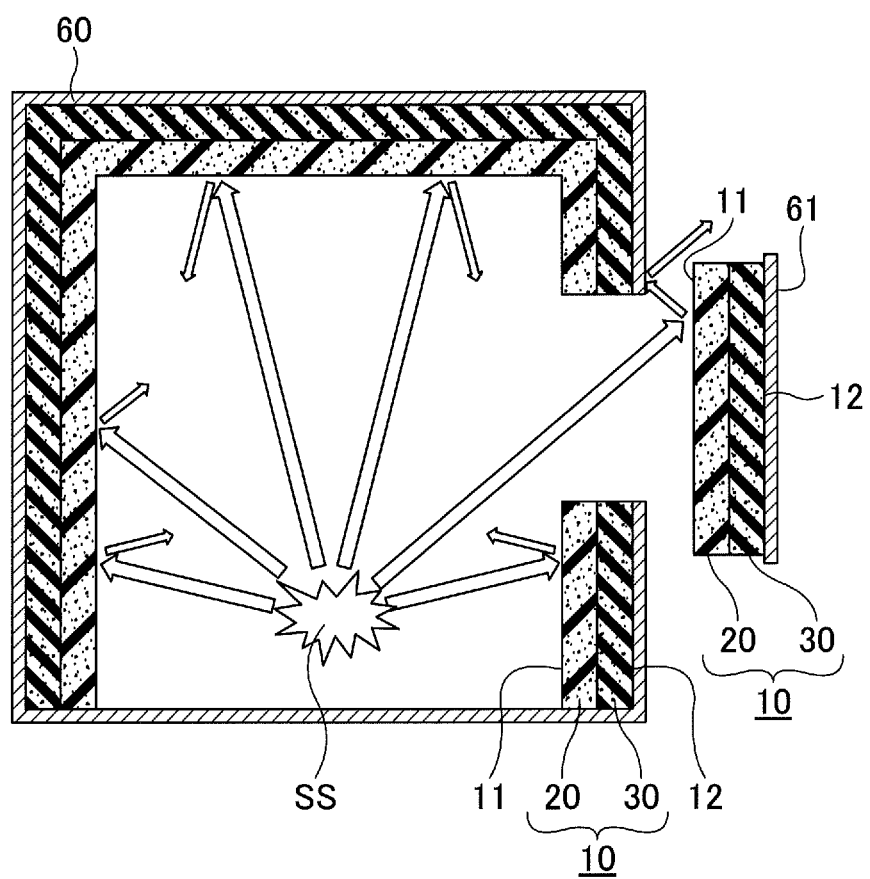
FIG. 7 is a cross-sectional view illustrating another installation example of the fibrous bodies of FIG. 1.

FIG. 7 is a cross-sectional view illustrating another installation example of the fibrous bodies of FIG. 1. In FIG. 7, the directions of the arrows indicate the directions in which sound waves travel, and the thicknesses of the arrows indicate the magnitudes of the sound wave energies. Also, in FIG. 7, SS represents a sound source that generates sound waves.

The fibrous body 10 is secured to the inner wall surface of the building 60. An air layer is not formed between the fibrous body 10 and the inner wall surface of the building 60, but may be formed. The fibrous body 10 secured to the inner wall surface of the building 60 suppresses sound waves generated inside the building 60 from reflecting inside the building 60 and reduces leakage of the sound waves to outside the building 60. Accordingly, the fibrous body 10 secured to the inner wall surface of the building 60 includes the surface 11 toward the inside of the building 60 as a surface on which sound waves are incident.

The fibrous body 10 is also provided outside the building 60 and is secured to a support member 61 facing an air vent of the building 60. The fibrous body 10 secured to the support member 61 forms a gap for air ventilation for the building 60 and suppresses sound waves from reflecting inside the building 60 and suppresses noise from leaking outside the building 60. Accordingly, the fibrous body 10 secured to the support member 61 includes the surface 11 toward the air vent of the building 60 as a surface on which sound waves are incident.

Note that although an air vent is formed on the building 60 In FIG. 7, the air vent may not be formed on the building

60, a wall may be located at the position of the air vent, and the fibrous body 10 may be secured to the inner wall surface of the wall.

Note that instead of the fibrous bodies 10 or in addition to the fibrous bodies 10, the fibrous bodies 10A illustrated in FIG. 3 may be used.

Figure 8:
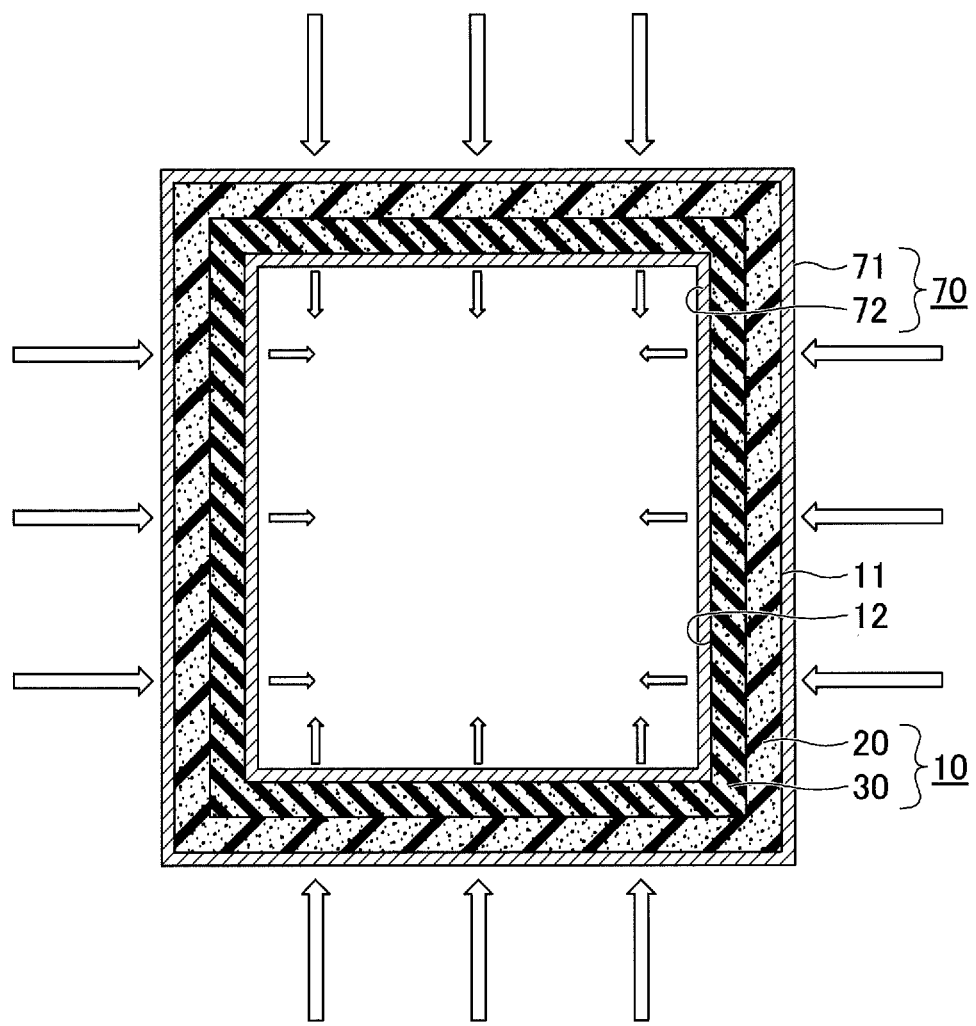
FIG. 8 is a cross-sectional view illustrating another installation example of the fibrous body of FIG. 1.

FIG. 8 is a cross-sectional view illustrating another installation example of the fibrous body of FIG. 1. In FIG. 8, the directions of the arrows indicate the directions in which sound waves travel, and the thicknesses of the arrows indicate the magnitudes of the sound wave energies.

The fibrous body 10 is provided between an outer panel 71 and an inner panel 72 of a vehicle 70. An air layer is not formed between the fibrous body 10 and the outer panel 71, but may be formed. Similarly, an air layer is not formed between the fibrous body 10 and the inner panel 72, but may be formed.

The fibrous body 10 reduces traveling sound of the vehicle 70 and reflected sound that occurs when the traveling sound is reflected by a tunnel or a sound shielding wall. The traveling sound and the reflected sound propagate from outside the outer panel 71 toward inside. Therefore, the fibrous body 10 includes the surface 11 toward the outside of the vehicle 70 as a surface on which sound waves are incident.

Note that instead of the fibrous body 10 or in addition to the fibrous body 10, the fibrous body 10A illustrated in FIG. 3 may be used.

Working Examples

In the following, specific working examples and comparative examples will be described. Among Examples 1 to 7 described below, Examples 1 to 5 are working examples, and Examples 6 to 7 are comparative examples.

Each fiber layer used in Examples 1-6 was prepared under the same conditions with the exception of adjusting its compression rate. Also, each fiber layer used in Example 7 was prepared under conditions similar to those for each fiber layer used in Examples 1 to 6, except that the ejection amount of resin and the temperature and the speed of air flow were adjusted in order to adjust the fiber diameter.

<Measurement of Average Fiber Diameters of Fibrous Bodies>

The average fiber diameters of the fibrous bodies were measured using an electron microscope "S-3500N" manufactured by Hitachi, Ltd. For Examples 1 to 6, electron micrographs were taken at a magnification of 1500, fiber diameters of 100 fibers were measured, and the average value of the 100 measured data items was obtained as the average fiber diameter. Also, for Example 7, electron micrographs were taken at a magnification of 500, fiber diameters of 100 fibers were measured, and the average value of the 100 measured data items was obtained as the average fiber diameter.

<Measurement of Sound Absorption Coefficients at Normal Incidence of Fibrous Bodies>

The sound absorption coefficients at normal incidence were measured in accordance with JIS A 1405-2 using a sound tube manufactured by Nihon Onkyo Co., Ltd. Specifically, the sound absorption coefficients at normal incidence were measured in a frequency range of 100 Hz to 2000 Hz by causing sound waves to enter vertically to a plane on one side of the prepared cylindrical fibrous body.

<Evaluation Results>

Figure 9:
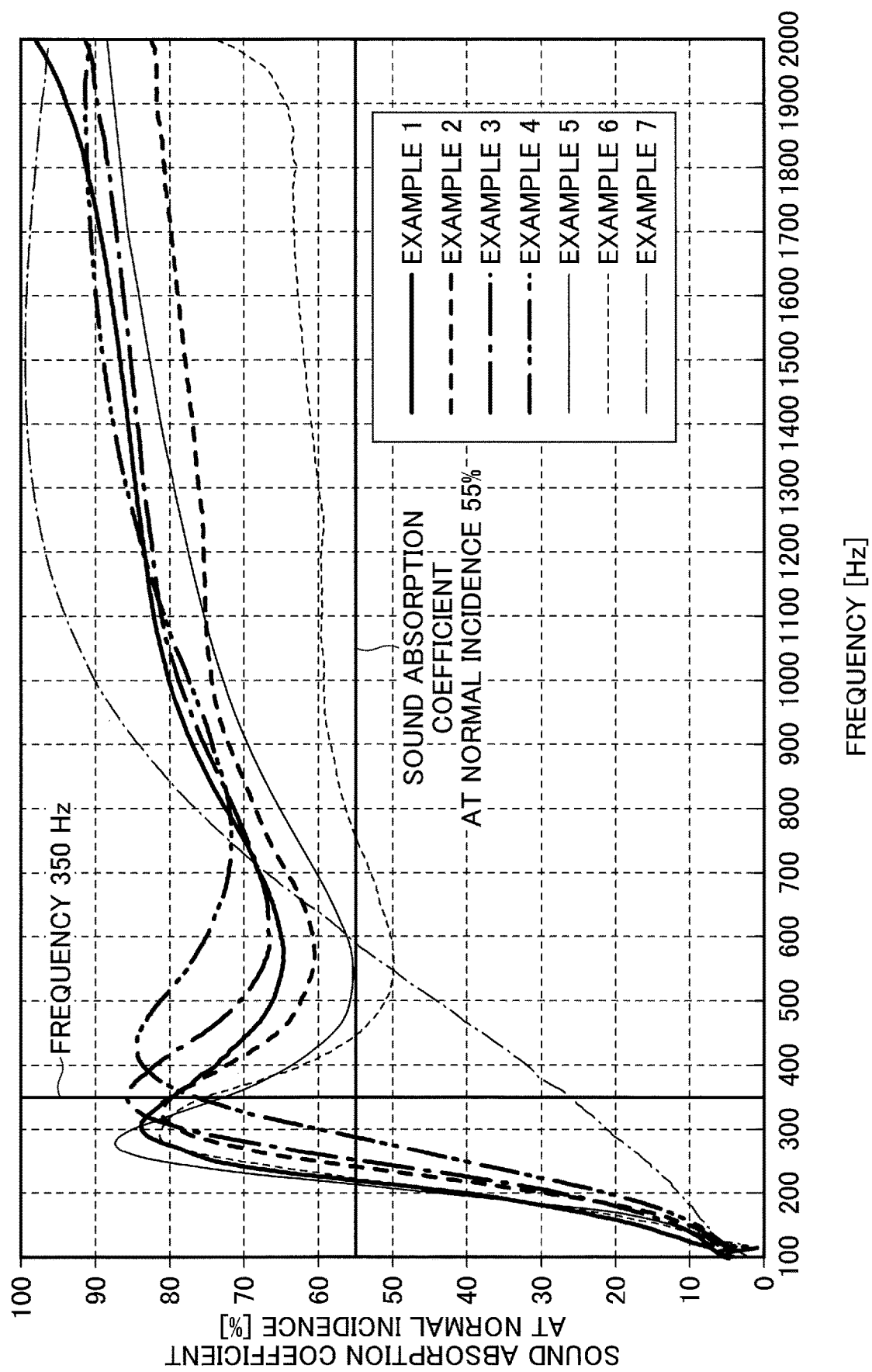
FIG. 9 is a diagram illustrating sound absorption characteristics of fibrous bodies according to Examples 1 to 7.

Table 1 indicates, for each of Examples 1 to 7, the bulk density and the average fiber diameter of the fibrous body and the densities and the thicknesses of three fiber layers (the surface layer, the intermediate layer, and the back layer) constituting the fibrous body. The sound absorption properties of the fibrous bodies are indicated in FIG. 9.

TABLE 1

| | BULK DENSITY [kg/m$^3$] | AVERAGE FIBER DIAMETER [μm] | FRONT SIDE FIBER LAYER (SURFACE LAYER) | | INTERMEDIATE FIBER LAYER (INTERMEDIATE LAYER) | | REAR SIDE FIBER LAYER (BACK LAYER) | |
|---|---|---|---|---|---|---|---|---|
| | | | DENSITY [kg/m$^3$] | THICKNESS [mm] | DENSITY [kg/m$^3$] | THICKNESS [mm] | DENSITY [kg/m$^3$] | THICKNESS [mm] |
| EXAMPLE 1 | 44 | 1.3 | 30 | 20 | 50 | 20 | 60 | 10 |
| EXAMPLE 2 | 46 | 1.3 | 30 | 15 | 30 | 15 | 70 | 20 |
| EXAMPLE 3 | 40 | 1.3 | 20 | 10 | 40 | 20 | 50 | 20 |
| EXAMPLE 4 | 32 | 1.3 | 20 | 10 | 30 | 20 | 40 | 20 |
| EXAMPLE 5 | 54 | 1.3 | 30 | 10 | 50 | 20 | 70 | 20 |
| EXAMPLE 6 | 46 | 1.3 | 70 | 10 | 20 | 20 | 60 | 20 |
| EXAMPLE 7 | 44 | 6.5 | 30 | 20 | 50 | 20 | 60 | 10 |

<Preparation of Fibrous Bodies>

For each of fibrous bodies of Example 1 to Example 7, cotton-like fiber layers obtained by a melt blowing method fibrillating polypropylene resin FR-185 manufactured by Lotte Chemical were obtained, and a plurality of fiber layers were stacked to be combined with a needle punching method to form a cylindrical shape with a diameter of 100 mm and a total thickness in the stacking direction of 50 mm.

The density of a fiber layer was adjusted, after obtaining the fiber layer and before stacking with other fiber layers, by compressing the fiber layer. By compressing the fiber layer, while maintaining the fiber diameter, the ratio of voids per unit volume was adjusted and the density of the fiber layer was adjusted.

In Examples 1 to 5, the average fiber diameter was 0.5 μm or more and 5 μm or less, the density of the surface layer on which sound waves are incident was greater than the density of the intermediate layer and the density of the back layer, and the density of the fibrous body increases from the surface to the back surface in a stepwise manner. Therefore, in Examples 1 to 5, the sound absorption coefficient at normal incidence of the fibrous body was 55% or more with respect to sound waves at any frequency within a range of 350 Hz or more to 2000 Hz or less.

In Examples 1 to 3 among Examples 1 to 5, the bulk density of the fibrous body was within a range of 40 kg/m$^3$ to 50 kg/m$^3$ or less. Therefore, sound waves at frequencies of 250 Hz or more to 300 Hz or less could also be efficiently attenuated while suppressing a decrease in the sound absorption coefficient at frequencies of 400 Hz or more to 1000 Hz or less.

Specifically, in Examples 1 to 3, because the bulk density of the fibrous body was within a range of 40 kg/m³ or more to 50 kg/m³ or less, the sound absorption coefficient at normal incidence of the fibrous body was 60% or more with respect to sound waves at any frequency within a range of 280 Hz or more to 2000 Hz or less.

In Examples 1 and 2 among Examples 1 to 3, because the bulk density of the fibrous body was within a range of 42 kg/m³ or more to 50 kg/m³ or less, the sound absorption coefficient at normal incidence of the fibrous body was 60% or more with respect to sound waves at any frequency within a range of 250 Hz or more to 2000 Hz or less.

On the other hand, in Example 6, the density of the surface layer on which sound waves are incident was less than the density of the intermediate layer and the density of the back layer, and frequencies of sound waves that can be efficiently attenuated were limited to a specific frequency band around 300 Hz. Also, in Example 7, because the average fiber diameter of the fibrous body exceeded 5 μm, the sound absorption coefficient of sound waves at frequencies of 600 Hz or less was low.

Although the embodiment of the present invention has been described above, the present invention is not limited to the embodiment described above, and various modifications and changes may be made within the scope of the present invention described in claims.

The present application is based on and claims priority to Japanese Patent Application No. 2016-205172, filed on Oct. 19, 2016, the entire contents of Japanese Patent Application No. 2016-205172 are hereby incorporated herein by reference.

DESCRIPTION OF REFERENCE SYMBOLS 10 fibrous body
11 surface
12 back surface
20 surface layer
30 back layer (propagation layer)
10A fibrous body
11A surface
12A back surface
20A surface layer
30A intermediate layer (propagation layer)
40A back layer (propagation layer)
10B fibrous body
11B first surface
12B second surface
20B first surface layer
30B intermediate layer (propagation layer)
40B second surface layer
10C fibrous body
20C surface layer
30C core layer (propagation layer)

The invention claimed is:

1. A soundproof structure comprising:
a porous fibrous body that attenuates incident sound waves,
wherein the fibrous body is formed of fibers having an average fiber diameter of 0.5 μm or more and 5 μm or less, and includes a surface layer on which the sound waves are incident and a propagation layer that is stacked with the surface layer and that propagates the sound waves from the surface layer, and
wherein the propagation layer includes a high density layer having a density higher than a density of the surface layer, and
wherein a bulk density of the fibrous body is 40 kg/m³ or more and 50 kg/m³ or less.

2. The soundproof structure according to claim 1,
wherein the fibrous body includes the surface layer for one surface in a stacking direction, and
wherein a density of the fibrous body increases in a stepwise manner or in a continuous manner from a surface of the fibrous body to a back surface of the fibrous body.

3. The soundproof structure according to claim 1,
wherein the fibrous body includes the surface layer for both surfaces in a stacking direction and includes the high density layer between the both surfaces, and
wherein a density of the fibrous body increases in a stepwise manner or in a continuous manner from each surface of the fibrous body to the propagation layer.

4. The soundproof structure according to claim 1,
wherein a thickness of the fibrous body is 40 mm or more and 100 mm or less, and
wherein a sound absorption coefficient at normal incidence of the fibrous body is 55% or more with respect to sound waves at any frequency in a range of 350 Hz or more to 2000 Hz or less.

5. A method of manufacturing the soundproof structure according to claim 1, the method comprising:
a step of forming the surface layer on which the sound waves are incident and a step of forming the high density layer, using fibers having an average fiber diameter of 0.5 μm or more and 5 μm or less.

* * * * *